3,577,404
BASIC PYRAZOLONE MONOAZO DYES CONTAINING AN AMMONIUM OR HYDRAZINIUM GROUP
Roland Entschel, Basel, Curt Mueller, Binningen, Basel-Land, and Willy Steinemann, Basel, Switzerland, assignors to Sandoz Ltd., also known as Sandoz A.G., Basel, Switzerland
No Drawing. Filed July 23, 1968, Ser. No. 746,758
Claims priority, application Switzerland, Aug. 11, 1967, 11,369/67; July 15, 1968, 10,552/68
Int. Cl. C09b 29/38; D06p 1/06, 3/04
U.S. Cl. 260—162  12 Claims

ABSTRACT OF THE DISCLOSURE

Basic dyes of the formula

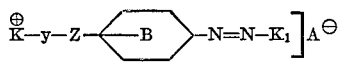

wherein
$K_1$ stands for a coupling compound of the pyrazolone series,
y stands for an alkylene or arylene radical,
Z stands for —O—, —S— or —$SO_2$—,
$K^\oplus$ stands for a hydrazinium- or an ammonium group
and wherein the ring B may bear further substituents;
are useful for dyeing acrylonitrile polymers and copolymers. Resulting dyeings have good fastness properties.

---

This invention relates to basic dyes of formula

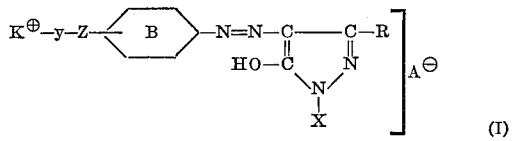

where R stands for a hydrocarbon or carboxylic acid amide radical, either of which may be substituted, or the cyano group, X for a hydrogen atom or a hydrocarbon radical which may be substituted, y for an alkylene or arylene radical, either of which may be substituted and which is attached to $K^\oplus$ through an optionally substituted alkylene radical or through a group of formula

—$CH_2$—CO—NH—$CH_2$— or —$CH_2$—NH—CO—$CH_2$—, Z for —O—, —S— or —$SO_2$—, $A^\ominus$ for an anion equivalent to the dye cation, and $K^\oplus$ for a group of formula

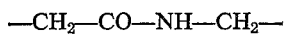

or

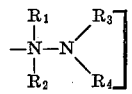

and where the aromatic ring B may be further substituted.
In Formula II and III $R_1$ stands for an alkyl or cycloalkyl radical which may be substituted, or together with $R_2$ and the $N^\oplus$ atom for a heterocycle, $R_2$ for an alkyl or cycloalkyl radical which may be substituted, or together with $R_1$ and the $N^\oplus$ atom for a heterocycle, $R_3$ and $R_4$ for hydrogen or identical or different alkyl or cycloalkyl radicals which may be substituted, $R_5$, $R_6$ and $R_7$ each stands for an alkyl or cycloalkyl radical which may be substituted; $R_1$ together with $R_3$ and/or $R_2$ together with $R_4$ and the N atoms adjacent to these substituents and $R_5$ and $R_6$ or $R_5$, $R_6$ and $R_7$ together with the $N^\oplus$ atom may form heterocycles.

The dyes of Formula I can be produced by reacting a compound of formula

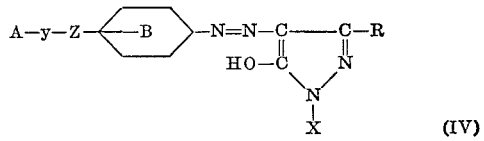

where A represents the acid radical of an ester, with a compound of formula

or

The dyes of Formula I can alternatively be obtained by coupling the diazo compound of an amine of formula

with a compound of formula

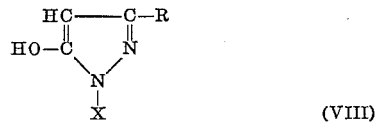

Dyes of Formula I in which $R_5$ and $R_6$ each represents an alkyl or cycloalkyl radical which may be substituted, or jointly with the adjacent N atom a saturated or partially saturated heterocycle, e.g. a piperidine, piperazine, pyrrolidine, morpholine or aziridine ring, can be arrived at by reacting, e.g. quaternating, a compound of formula

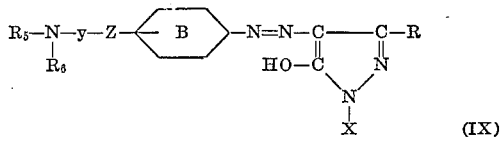

with a compound of formula $R_7$—A  (X)

A group of good dyes, for example, conform to formula

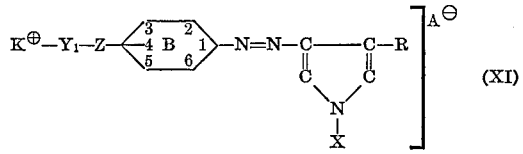

where $Y_1$ represents an alkylene radical which may be substituted, the aromatic ring B may be further substituted, the group —Z—$Y_1$—$K^\oplus$ is in position 3 or 4, and R, X, Z, $A^\ominus$ and $K^\oplus$ have the significances given in the foregoing.
Similarly good dyes correspond to formula

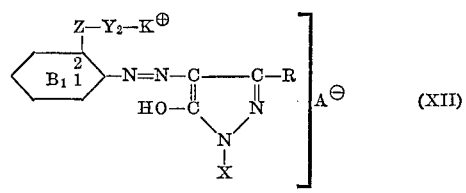

where $Y_2$ represents an alkylene radical which may be substituted, the aromatic ring $B_1$ may be substituted by alkyl, alkoxy, cyano, nitro, alkylsulphonyl, arylsulphonyl, carbonyl or trifluoromethyl or halogen, and R, X, Z, $A^\ominus$ and $K^\oplus$ have the aforestated meanings.

Equally good dyes are those of formula

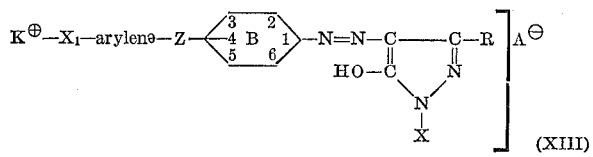

where arylene stands for an arylene radical which may be substituted, e.g. a phenylene, naphthylene or tetrahydronaphthylene radical, $X_1$ for an alkylene radical which may be substituted or a radical of formula $$-CH_2-CO-NH-CH_2-$$

or $$-CH_2-NH-CO-CH_2-$$

the aromatic ring B may be further substituted and R, X, Z, $A^\ominus$ and $K^\oplus$ bear the meanings given them above.

The anion $A^\ominus$ in the dyes of Formula I can be replaced by other anions with the aid of an ion exchange or by reaction with salts or acids, of necessity in more than one stage, e.g. via the hydroxide. It is desirable for the dyes to be free from sulphonic acid groups. Particularly good dyes are obtained, for example, when X denotes a phenyl radical which may be substituted and R, a hydrocarbon radical which may be substituted, e.g. an alkyl radical, e.g. the methyl group.

Similarly good dyes result when y has the significance of a radical of formula

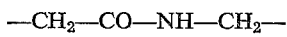

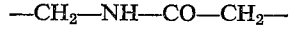

and Z is an oxygen atom. Examples of the optionally substituted hydrocarbon radical are alkyl, aryl and cycloalkyl radicals, e.g. a phenyl, naphthyl, tetrahydronaphthyl or cyclohexyl radical. If these radicals are substituted they contain, for example, a hydroxyl group, a halogen atom, the cyano group or an aryl radical. In each instance halogen represents preferably chlorine or bromine.

The aryl or arylene radicals may be substituted by alkoxy goups. The alkyl or alkoxy radicals generally bear 1 to 6 or preferably 1 to 4 carbon atoms.

The carboxylic acid phenyl amide radical is an example of a substituted carboxylic acid amide radical. The alkylene radical may be straight or branched; optionally it contains 1 to 10 or preferably 1 to 6 carbon atoms and it may be substituted, e.g., by a hydroxyl group.

In most instances Z represents an oxygen atom. The aromatic ring B, or $B_1$ where present, may be substituted by an alkyl, alkoxy, cyano, nitro, alkylsulphonyl, arylsulphonyl, carbonyl or trifluoromethyl group or by a halogen atom.

When neither $R_3$ nor $R_4$ stands for a hydrogen atom, the radicals $R_1$ to $R_4$ represent optionally substituted alkyl radicals, such as optionally substituted methyl, ethyl, propyl or butyl radicals, or cycloalkyl radicals, such as cyclohexyl radicals. If these radicals are substituted they contain in particular a hydroxyl group, a halogen atom, the cyano or a phenyl group.

In conjunction with the adjacent $N^\oplus$ atom the radicals $R_1$ and $R_2$ may form a heterocycle, e.g. a pyrrolidine, piperazine, morpholine, aziridine or piperidine ring. The radical $R_1$, jointly with $R_3$ and/or the radical $R_2$ together with $R_4$ and the N atoms adjacent to these substituents, may form a saturated or unsaturated, preferably five- or six-membered heterocycle, for example a pyrazolidine, pyridazine or pyrazoline ring such as a trimethylene-pyrazolidine or tetramethylenepyrazolidine ring.

The radicals $R_5$ to $R_7$ represent optionally substituted alkyl radicals, e.g. optionally substituted methyl, ethyl, propyl or butyl radicals, or cycloalkyl radical such as cyclohexyl radicals. If these radicals are substituted they contain in particular a hydroxyl group, a halogen atom, the cyano or a phenyl group.

The radicals $R_5$ and $R_6$, jointly with the adjacent $N^\oplus$ atom, may form a heterocycle, for example a pyrrolidine, piperidine, morpholine, aziridine or piperazine ring.

The radicals $R_5$ to $R_7$, together with the adjacent $N^\oplus$ atom, may form a heterocycle, e.g. a group of formula

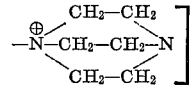

or may stand for a pyridine ring.

The acid radicals A are preferably those of hydrohalic acids; A stands preferably for Cl or Br, Other acid radicals A are for example those of sulphuric acid, a sulphonic acid or of hydrogen sulphide.

The anion $A^\ominus$ may be an organic or inorganic ion, e.g. a halogen ion, such as chlorine, bromine or iodine, or methylsulphate, sulphate, disulphate, perchlorate, phosphate, phosphotungstic molybdate, benzenesulphonate, naphthalenesulfonate, 4-chlorobenzene sulphonate, oxalate, maleinate, acetate, propionate, methanesulphonate, chloracetate or benzoate, or complex anions such as zinc chloride double salts. The reaction of a compound of Formula IV with a compound of Formula V or VI is effected preferably in an organic solvent at temperatures of $-50°$ to $+250°$ C., preferably at $-10°$ to $+120°$ C.

The reaction can alternatively be carried out in aqueous medium, if necessary with the addition of an organic solvent, or in the absence of solvent at the aforestated temperatures.

The coupling reaction of the diazotized compounds of Formula VII with compounds of Formula VIII generally takes place in alkaline medium with cooling, e.g. at 0–5° C. It can however be effected in acid, e.g. acetic acid, medium.

The reaction of a compound of Formula IX with a compound of Formula X is conducted preferably in an inert solvent, or if necessary in aqueous suspension, or in the absence of solvent in an excess of a compound of Formula X, at elevated temperatures and if necessary in the presence of a buffer.

Examples of compounds of Formula X are alkyl halides, e.g. methyl or ethyl chloride, bromide and iodide, alkylsulphates such as dimethylsulphate, and acrylic amides-hydrochloride, e.g. $CH_2=CH-CONH_2/HCl$, epoxides, epichlorohydrins, etc.

The new dyes are employed for dyeing and printing filaments, fibres and textiles made therefrom which consist wholly or in part of acrylonitrile polymers or copolymers. They are used further for the mass coloration of plastics, for paper dyeing in the beater and for leather dyeing.

The dyes of this invention, provided they are present as salts of inorganic or organic acids that form approximately neutral solutions in water, are dyeable from weakly alkaline, neutral or weakly acid baths. It is advisable to dye from an acid bath, either by setting the bath at the start wtih a suitable acid such as acetic, formic, tartaric, sulphuric or naphthalenesulphonic acid, alkali bisulphate or an acid alkali phosphate, or by adding an agent to the bath which produces acid during the dyeing process. Examples of such agents are the salts of volatile bases of strong non-volatile acids, such as ammonium sulphate, and the water soluble esters of organic acids which saponify during dyeing, such as the methyl or ethyl esters of aliphatic oxy acids, e.g. lactic, malic and tartaric acids. If the dyes are applied in mineral acid solution, as is the case with betain-like compounds, the mineral acid also can be neutralized during dyeing by the gradual addition of alkaline salts of weaker acids, e.g. sodium acetate. The dyes are applicable with heating in open baths and in enclosed machines at temperatures above 100° C. under pressure.

Under the normal dyeing conditions as described, the baths are largely exhausted in normal dyeing times, and level, usually very bright dyeings are obtained which have good light and wet fastness and pH stability.

The dyeing obtained further have good fastness to washing, water, sea water, perspiration, sublimation, cross dyeing, decatizing, pressing, bleaching, dry cleaning and solvents.

The dyes are well soluble in water and have good power of buildup. They are suitable for combination and in mixture with other dyes give excellent dyeings. They reserve wool.

In Belgian Patent 633,447 the dye of formula

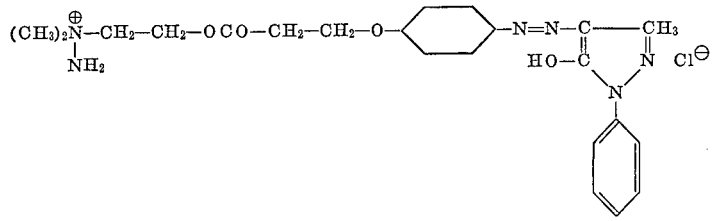

is described, which among other uses is employed for dyeing polyacrylonitrile fibres. The dyes of Formula I show better power of build-up on polyacrylonitrile fibres from baths of Permutit prepared water and are highly stable in Permutit water.

In the following examples the parts and percentages are by weight and the tempeartures in degrees centigrade.

EXAMPLE 1

17.2 parts of 4-amino-2'-chlorophenyl-ethyl, prepared by reducing 4-nitro-2'-chlorophenyl-ethyl ether by the known method, are dissolved in 150 parts of 6% hydrochloric acid and diazotized at 0° with an aqueous solution of 6.9 parts of sodium nitrite. The diazo solution is neutralized and united with a fine ice-cold suspension of 19 parts of 1-phenyl-3-methyl-5-pyrazolone in 150 parts of water, on which coupling takes place. The dye settles out and is collected on a filter.

35.7 parts of the chlorine containing monoazo dye (a) thus obtained are dissolved in 400 parts of toluene at 80°. 6.6 parts of asymmetrical dimethyl hydrazine are added to the solution, the reaction temperature is raised at 95° over one hours and this temperature is held for several hours with stirring until the reatcion is complete. The solution is then cooled to room temperature and the precipitated dye filtered off. This new water soluble dye can be purified by recrystallization. It is suitable for dyeing polyacrylonitrile fibres in very fast yellow shades.

EXAMPLE 2

A dye very similar to that of Example 1 and with equally good properties is obtained when the chlorine containing dye (a) produces by the procedure of that example is reacted with dimethylamine in toluene at 60–80° and the resulting dye quaternated with dimethyl-sulphate at 100–105°.

EXAMPLE 3

18 parts of 2-amino-2'-dimethylamino-phenylethyl ether are dissolved in 200 parts of 6% hydrochloric acid and diazotized with 6.9 parts of sodium nitrite. The ice cold diazo solution is neutralized and combined with a fine aqueous suspension of 18.8 parts of 1-(2'-methylphenyl)-3-methyl-5-pyrazolone at 0°. The isolated, dried dye is dissolved in 700 parts of boiling chlorobenzene, and after the addition of 25 parts of dimethyl sulphate the solution is boiled for an hour with reflux. On cooling to room temperature the precipitated water soluble dye is collected on a filter, washed with petroleum ether and purified by recrystallization. This dye is suitable for application to polyacrylonitrile fibres, on which it gives very fast yellow dyeings.

Very similar dyes having equally good properties are arrived at when the procedure of this example is followed, using in place of the 18 parts of 2-amino-2'-dimethyl-aminophenylethyl ether 18 parts of 3-amino-2'-dimethyl-amino-phenylethyl ether, or in place of the 18.8 parts of 1-(2'-methylphenyl)-3-methyl-5-pyrazolone 20.9 parts of 1-(2'-chlorophenyl)-3-methyl-5-pyrazolone.

EXAMPLE 4

The compound 4-(4'-aminophenoxy)-benzyl-N,N-dimethyl-hydrazinium chloride is prepared by reaction of 4 - (4' - acetaminophenoxy)-benzylchloride with asymmetrical dimethyl hydrazine in toluene solution and subsequent saponification to the amino compound. 29.3 parts of this chloride are diazotized with 6.9 prats of sodium nitrite in 200 parts of ice-cold 6% hydrochloric acid. The neutralized diazo solution is then combined with a solution, likewise neutral and cooled to 0°, of 11 parts of 3-methyl-5-pyrazolone in 100 parts of water. Stirring is continued at 0° until the coupling reaction is complete. The dye is isolated and purified by the known methods. It is suitable for dyeing polyacrylonitrile fibres in very fast yellow shades.

A dye having the same good properties is obtained when the procedure of Example 4 is followed, with the 29.3 parts of 4-(4' - amino - phenoxy)-benzyl-N,N-dimethyl-hydrazinium chloride replaced by 35 parts of the amino compound of formula

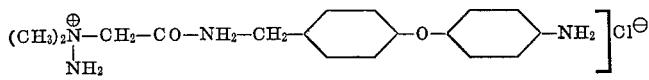

EXAMPLE 5

48.5 parts of the dye of formula

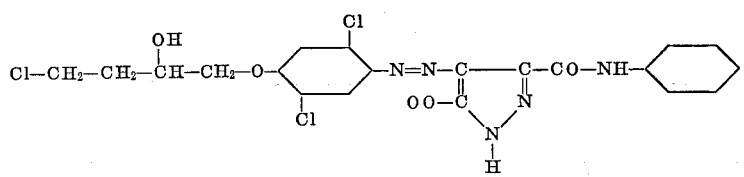

which is produced by coupling diazotized 1-(4'-amino-2', 5'-dichlorophenoxy) - 3 - chloropropanol - (2) with 5-pyrazolone-3-carboxylic acid anilide, are entered into 250 parts of a 3% aqueous N,N-dimethylhydrazine solution at room temperature. After stirring for 1 hour at this temperature the reaction mixture is raised to 85° over 3 hours and is held at 85–95° for 6 hours with reflux. The dye formed is isolated by known methods. It dyes polyacrylonitrile fibres in fast yellow shades.

DYEING EXAMPLE 20 parts of the dye of Example 1 and 80 parts of dextrin are ground in a ball mill for 48 hours. One part of the preparation obtained is pasted with 1 part of 40% acetic acid solution, 400 parts of distilled water are run over the paste and the whole is boiled for a short time. It is then diluted with 7000 parts of distilled water, with the final addition of 2 parts of glacial acetic acid. 100 parts of polyacrylonitrile fabric, previously treated for 10–15 minutes at 60° C. in 20 minutes, held at the boil for 1 hour, and the fabric then well rinsed. A yellow dyeing good light wet fastness properties is obtained.

In the following table, details are given of the structural composition of further dyes which can be produced by the procedures of Examples 1 to 5.

The symbols $K^\oplus$, y, Z, R and X in the formula

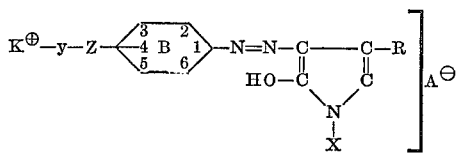

have the meanings given them in the table. The anion $A^\ominus$ may be any one of those named in the specification. The symbol $K^\oplus$ stands for any one of the radicals $K_1$–$K_{23}$ listed in Table A below. In a given dye these groupings may be exchanged for any one of the other groupings here given.

TABLE A $K^\oplus$ may stand for any one of the symbols $K_1$–$K_{23}$ which represent the following groupings:

TABLE A

| | |
|---|---|
| $K_1$ represents | $[-N(CH_3)_3]$ |
| $K_2$ represents | $[-N(C_2H_5)_3]$ |
| $K_3$ represents | $[-N(C_2H_5)_2]$ with $CH_3$ |
| $K_4$ represents | $[-N(C_2H_4OH)_3]$ |
| $K_5$ represents | $[-N(C_2H_4OH)_2]$ with $CH_3$ |
| $K_6$ represents | piperazinyl ring |
| $K_7$ represents | pyridinyl |
| $K_8$ represents | N-methyl pyridinyl H |
| $K_9$ represents | N-methyl pyridinyl H |

TABLE A.—Continued

| | |
|---|---|
| $K_{10}$ represents | N-methyl, H, O ring |
| $K_{11}$ represents | $[-N(CH_3)_2]$ with $C_2H_4OH$ |
| $K_{12}$ represents | $[-N-C_2H_4OH]$ with $CH_3$, $C_2H_5$ |
| $K_{13}$ represents | $[-N(CH_3)_2]$ with $C_2H_5$ |
| $K_{14}$ represents | $H_3C$-pyridinyl |
| $K_{15}$ represents | quinolinyl |
| $K_{16}$ represents | $[-N(CH_3)_2]$ with $NH_2$ |
| $K_{17}$ represents | $[-N(C_2H_5)_2]$ with $NH_2$ |
| $K_{18}$ represents | $[-N(C_2H_4OH)_2]$ with $NH_2$ |
| $K_{19}$ represents | piperazinyl with $NH_2$ |
| $K_{20}$ represents | piperazinyl with $NH_2$ |
| $K_{21}$ represents | morpholinyl with $NH_2$ |
| $K_{22}$ represents | $[-N(C_2H_5CN)_2]$ with $NH_2$ |
| $K_{23}$ represents | diazabicyclic ring |

TABLE

Position of $K^\oplus$-y-Z-group in ring B and signification of $K^\oplus$, y, and Z or of $K^\oplus$ and y jointly with Z

| Ex. No. | Position | $K^\oplus$ | y | Z | Substituent in ring B and position | R | X | Shade of dyeing on acrylic fibre |
|---|---|---|---|---|---|---|---|---|
| 6 | 2 | $K_1$ | $-CH_2CH_2-$ | $-O-$ | | $-CH_3$ | H | Greenish yellow. |
| 7 | 2 | $K_2$ | Same as above | $-O-$ | | Same as above | H | Do. |
| 8 | 2 | $K_7$ | do | $-O-$ | | do | H | Do. |
| 9 | 2 | $K_{15}$ | do | $-O-$ | | do | H | Do. |
| 10 | 2 | $K_{16}$ | do | $-O-$ | 4-Cl | do | H | Do. |
| 11 | 2 | $K_{19}$ | do | $-O-$ | 4-Cl | do | H | Do. |
| 12 | 2 | $K_1$ | do | $-S-$ | | do | H | Do. |
| 13 | 2 | $K_7$ | do | $-SO_2-$ | | do | H | Do. |
| 14 | 2 | $K_1$ | do | Same | 4-Br | do | $-CH_3$ | Do. |
| 15 | 2 | $K_7$ | do | do | | do | Same as above | Do. |
| 16 | 2 | $K_{15}$ | do | do | | do | do | Do. |

3,577,404

TABLE—Continued

| Ex. No. | Position of K⊕-y-Z-group in ring B and signification of K⊕, y, and Z or of K⊕ and y jointly with Z | | | Substituent in ring B and position | R | X | Shade of dyeing on acrylic fibre |
|---|---|---|---|---|---|---|---|
| | Position | K⊕ | y | Z | | | |
| 17 | 2 | $K_{16}$ | do | do | do | do | Do. |
| 18 | 2 | $K_{20}$ | do | do | do | do | Do. |
| 19 | 2 | $K_{16}$ | do | —S— | do | do | Do. |
| 20 | 2 | $K_{15}$ | do | —$SO_2$— | do | do | Do. |
| 21 | 2 | $K_1$ | do | Same | —CO—$NH_2$ | H | Yellow. |
| 22 | 2 | $K_2$ | do | do | Same as above | H | Do. |
| 23 | 2 | $K_7$ | do | do | do | H | Do. |
| 24 | 2 | $K_8$ | do | do | do | H | Do. |
| 25 | 2 | $K_{13}$ | do | do | do | H | Do. |
| 26 | 2 | $K_{15}$ | do | do | —Cl | do | H | Do. |
| 27 | 2 | $K_{16}$ | do | do | do | H | Do. |
| 28 | 2 | $K_{17}$ | do | —$SO_2$— | —CO—$NH_2$ | H | Do. |
| 29 | 2 | $K_1$ | do | —S— | Same as above | H | Do. |
| 30 | 2 | $K_7$ | do | —$SO_2$— | do | H | Do. |
| 31 | 2 | $K_1$ | —$CH_2$—CH—$CH_2$—<br>\|<br>OH | —O— | do | H | Do. |
| 32 | 2 | $K_{15}$ | Same as above | —O— | do | H | Do. |
| 33 | 2 | $K_{16}$ | do | —O— | do | H | Do. |
| 34 | 2 | $K_1$ | —$CH_2CH_2$— | —O— | —$CONH_2$ | 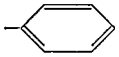 | Reddish yellow. |
| 35 | 2 | $K_2$ | Same as above | —O— | Same as above | Same as above | Do. |
| 36 | 2 | $K_{10}$ | do | —O— | do | do | Do. |
| 37 | 2 | $K_{16}$ | do | —O— | do | do | Do. |
| 38 | 2 | $K_{20}$ | do | —O— | 5-chloro | do | do | Do. |
| 39 | 2 | $K_1$ | do | —S— | do | do | Do. |
| 40 | 2 | $K_2$ | do | —$SO_2$— | do | do | Do. |
| 41 | 2 | $K_{16}$ | —$CH_2$—CH—$CH_2$—<br>\|<br>OH | —S— | do | do | Do. |
| 42 | 2 | $K_1$ | —$CH_2CH_2$— | —S— | —$CH_3$ | do | Yellow. |
| 43 | 2 | $K_2$ | Same as above | —S— | 5-methyl | Same as above | do | Do. |
| 44 | 2 | $K_{13}$ | do | —S— | do | do | do | Do. |
| 45 | 2 | $K_{16}$ | do | —S— | do | do | do | Do. |
| 46 | 2 | $K_{17}$ | do | —S— | do | do | do | Do. |
| 47 | 2 | $K_{19}$ | do | —S— | do | do | Do. |
| 48 | 2 | $K_7$ | —$CH_2$—CH—$CH_2$—<br>\|<br>OH | —S— | do | do | Do. |
| 49 | 2 | $K_1$ | —$CH_2CH_2$— | —S— | do | 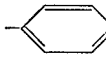 | Do. |
| 50 | 2 | $K_2$ | Same as above | —S— | do | Same as above | Do. |
| 51 | 2 | $K_7$ | do | —S— | do | do | Do. |
| 52 | 2 | $K_{16}$ | do | —S— | do | do | Do. |
| 53 | 2 | $K_1$ | do | —S— | do | do | Do. |
| 54 | 2 | $K_1$ | do | —S— | do | 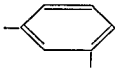 | Do. |
| 55 | 2 | $K_2$ | do | —S— | do | H | Do. |
| 56 | 2 | $K_7$ | do | —S— | do | H | Do. |
| 57 | 2 | $K_{16}$ | do | —S— | do | H | Do. |
| 58 | 2 | $K_{20}$ | do | —S— | do | H | Do. |
| 59 | 2 | $K_1$ | do | —S— | do |  | Do. |
| 60 | 2 | $K_{16}$ | do | —S— | do | Same as above | Do. |
| 61 | 2 | $K_1$ | do | —S— | do | 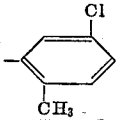 | Do. |
| 62 | 2 | $K_7$ | do | —S— | do | Same as above | Do. |
| 63 | 2 | $K_{16}$ | do | —S— | do | do | Do. |
| 64 | 2 | $K_1$ | do | —S— | 4-$NO_2$ | do | do | Reddish yellow. |
| 65 | 2 | $K_7$ | do | —S— | Same | do | do | Do. |
| 66 | 2 | $K_{15}$ | do | —S— | do | do | do | Do. |
| 67 | 2 | $K_{16}$ | do | —S— | do | do | do | Do. |
| 68 | 2 | $K_1$ | do | —S— | 4-nitro, 5-chloro | do | 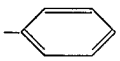 | Do. |
| 69 | 2 | $K_{16}$ | do | —S— | do | do | Same as above | Do. |
| 70 | 2 | $K_1$ | do | —S— | do | do | H | Yellow. |
| 71 | 2 | $K_{15}$ | —$CH_2$—CH—$CH_2$—<br>\|<br>OH | —S— | do | do | H | Do. |
| 72 | 2 | $K_1$ | —$CH_2CH_2$— | —O— | 5-chloro | —CO—NH—$C_2H_4$—OH | H | Do. |

TABLE—Continued

| Ex. No. | Position | K⊕ | y | Z | Substituent in ring B and position | R | X | Shade of dyeing on acrylic fibre |
|---|---|---|---|---|---|---|---|---|
| 73 | 2 | $K_{16}$ | Same as above | —O— | | —CO—NH—$C_2H_4$—OH |  | Do. |
| 74 | 2 | $K_1$ | ...do... | —O— | 4—$SO_2$—$N(CH_3)_2$ | —$CH_3$ | H | Do. |
| 75 | 2 | $K_{16}$ | ...do... | —O— | 4—$SO_2$—$N(CH_3)_2$ | Same as above | H | Do. |
| 76 | 2 | $K_1$ | ...do... | —O— | 4—$SO_2CH_3$ | ...do... |  | Do. |
| 77 | 2 | $K_{16}$ | ...do... | —O— | Same as above | ...do... | Same as above | Do. |
| 78 | 2 | $K_1$ | ...do... | —O— | ...do... | ...do... |  (COOH) | Do. |
| 79 | 2 | $K_7$ | ...do... | —O— | 5—$SO_2$—$N(CH_3)_2$ | ...do... | Same as above | Do. |
| 80 | 2 | $K_{16}$ | ...do... | —O— | Same as above | ...do... | ...do... | Do. |
| 81 | 2 | $K_1$ | ...do... | —S— | ...do... | ...do... | ...do... | Do. |
| 82 | 2 | $K_7$ | ...do... | —$SO_2$— | ...do... | ...do... | ...do... | Do. |
| 83 | 2 | $K_1$ | —$CH_2$—CHOH—$CH_2$— | —O— | 4-nitro | ...do... |  | Reddish yellow. |
| 84 | 2 | $K_{16}$ | —$CH_2$—CHOH—$CH_2$— | —O— | ...do... | ...do... | Same as above | Do. |
| 85 | 3 | $K_1$ | —$C_2H_4$— | —O— | | ...do... | H | Greenish yellow. |
| 86 | 3 | $K_2$ | Same as above | —O— | | ...do... | H | Do. |
| 87 | 3 | $K_7$ | ...do... | —O— | | ...do... | H | Do. |
| 88 | 3 | $K_9$ | ...do... | —O— | | ...do... | H | Do. |
| 89 | 3 | $K_{13}$ | ...do... | —O— | 4-methyl | ...do... | H | Do. |
| 90 | 3 | $K_{15}$ | ...do... | —O— | | ...do... | H | Do. |
| 91 | 3 | $K_{16}$ | ...do... | —O— | | ...do... | H | Do. |
| 92 | 3 | $K_{17}$ | ...do... | —O— | 4-chloro | ...do... | H | Do. |
| 93 | 3 | $K_{19}$ | ...do... | —O— | | ...do... | H | Do. |
| 94 | 3 | $K_{20}$ | ...do... | —O— | | ...do... | H | Do. |
| 95 | 3 | $K_{22}$ | ...do... | —O— | | ...do... | H | Do. |
| 96 | 3 | $K_1$ | ...do... | —O— | 6-nitro | ...do... |  | Reddish yellow. |
| 97 | 3 | $K_7$ | ...do... | —O— | ...do... | ...do... | Same as above | Do. |
| 98 | 3 | $K_{15}$ | ...do... | —S— | ...do... | ...do... | ...do... | Do. |
| 99 | 3 | $K_{16}$ | ...do... | —$SO_2$— | ...do... | ...do... | ...do... | Do. |
| 100 | 3 | $K_{19}$ | ...do... | —O— | ...do... | ...do... | ...do... | Do. |
| 101 | 3 | $K_1$ | —$CH_2CH_2$— | —O— | 4-nitro, 6-chloro | ...do... | ...do... | Yellow. |
| 102 | 3 | $K_2$ | Same as above | —O— | ...do... | ...do... | ...do... | Do. |
| 103 | 3 | $K_6$ | ...do... | —O— | ...do... | ...do... | ...do... | Do. |
| 104 | 3 | $K_7$ | ...do... | —O— | ...do... | ...do... | ...do... | Do. |
| 105 | 3 | $K_8$ | ...do... | —O— | ...do... | ...do... | ...do... | Do. |
| 106 | 3 | $K_{10}$ | ...do... | —O— | ...do... | ...do... | ...do... | Do. |
| 107 | 3 | $K_{14}$ | ...do... | —O— | ...do... | ...do... | ...do... | Do. |
| 108 | 3 | $K_{15}$ | ...do... | —O— | ...do... | ...do... | ...do... | Do. |
| 109 | 3 | $K_{16}$ | ...do... | —O— | ...do... | ...do... | ...do... | Do. |
| 110 | 3 | $K_{17}$ | ...do... | —O— | ...do... | ...do... | ...do... | Do. |
| 111 | 3 | $K_{18}$ | ...do... | —O— | ...do... | ...do... | ...do... | Do. |
| 112 | 3 | $K_{19}$ | ...do... | —O— | ...do... | ...do... | ...do... | Do. |
| 113 | 3 | $K_{20}$ | ...do... | —O— | ...do... | ...do... | ...do... | Do. |
| 114 | 3 | $K_{21}$ | ...do... | —O— | ...do... | ...do... | ...do... | Do. |
| 115 | 3 | $K_{22}$ | ...do... | —O— | ...do... | ...do... | ...do... | Do. |
| 116 | 3 | $K_{23}$ | ...do... | —O— | ...do... | ...do... | ...do... | Do. |
| 117 | 3 | $K_1$ | ...do... | —S— | ...do... | ...do... | ...do... | Do. |
| 118 | 3 | $K_{15}$ | ...do... | —S— | ...do... | ...do... | ...do... | Do. |
| 119 | 3 | $K_{15}$ | ...do... | —$SO_2$— | ...do... | ...do... | ...do... | Do. |
| 120 | 3 | $K_1$ | ...do... | —$SO_2$— | ...do... | —CO—$NH_2$ | ...do... | Reddish yellow. |
| 121 | 3 | $K_7$ | ...do... | —S— | ...do... | Same as above | ...do... | Do. |
| 122 | 3 | $K_{15}$ | ...do... | —$SO_2$— | ...do... | ...do... | H | Do. |
| 123 | 3 | $K_{16}$ | ...do... | —O— | ...do... | ...do... | —$CH_3$ | Do. |
| 124 | 3 | $K_1$ | —$CH_2$—CH(OH)—$CH_2$— | —O— | ...do... | ...do... | Same as above | Do. |
| 125 | 3 | $K_7$ | Same as above | —S— | ...do... | ...do... | ...do... | Do. |
| 126 | 3 | $K_{15}$ | ...do... | —$SO_2$— | ...do... | ...do... | ...do... | Do. |
| 127 | 3 | $K_{15}$ | ...do... | —$SO_2$— | ...do... | ...do... | ...do... | Do. |
| 128 | 4 | $K_1$ | —$CH_2$—$CH_2$— | —O— | | —$CH_3$ | 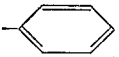 | Yellow. |
| 129 | 4 | $K_2$ | Same as above | —O— | | Same as above | Same as above | Do. |
| 130 | 4 | $K_3$ | ...do... | —O— | | ...do... | ...do... | Do. |
| 131 | 4 | $K_4$ | ...do... | —O— | | ...do... | H | Do. |
| 132 | 4 | $K_5$ | —$CH_2$—CH(OH)—$CH_2$— | —O— | | ...do... |  | Do. |
| 133 | 4 | $K_6$ | Same as above | —O— | | ...do... | Same as above | Do. |
| 134 | 4 | $K_7$ | —$CH_2CH_2$— | —O— | | ...do... | 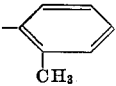 (—$CH_3$, $CH_3$) | Do. |

TABLE—Continued

| Ex. No. | Position of K⊕-y-Z-group in ring B and signification of K⊕, y, and Z or of K⊕ and y jointly with Z | | | Substituent in ring B and position | R | X | Shade of dyeing on acrylic fibre |
|---|---|---|---|---|---|---|---|
| | Position | K⊕ | y | Z | | | |
| 135 | 4 | K₈ | Same as above | —O— | do | Same as above | Do. |
| 136 | 4 | K₉ | do | —O— | do | do | Do. |
| 137 | 4 | K₁₀ | do | —O— | do | —CH₃ | Do. |
| 138 | 4 | K₁₁ | do | —O— | do | —CH₃ | Do. |
| 139 | 4 | K₁₂ | do | —O— | do |  | Do. |
| 140 | 4 | K₁₃ | do | —O— | do | Same as above | Do. |
| 141 | 4 | K₁₄ | do | —O— | do | do | Do. |
| 142 | 4 | K₁₅ | do | —O— | do | do | Do. |
| 143 | 4 | K₁₆ | do | —O— | do | do | Do. |
| 144 | 4 | K₁₇ | do | —O— | do | do | Do. |
| 145 | 4 | K₁₈ | do | —O— | do | do | Do. |
| 146 | 4 | K₁₉ | do | —O— | do | H | Do. |
| 147 | 4 | K₂₀ | do | —O— | do | H | Do. |
| 148 | 4 | K₂₁ | do | —O— | do |  | Do. |
| 149 | 4 | K₂₂ | do | —O— | do | Same as above | Do. |
| 150 | 4 | K₂₃ | do | —O— | do | do | Do. |
| 151 | 4 | K₁ | do | —O— | 3—Cl | do | H | Do. |
| 152 | 4 | K₇ | do | —O— | Same as above | do | H | Do. |
| 153 | 4 | K₁₆ | do | —O— | do | do | H | Do. |
| 154 | 4 | K₁ | do | —S— | | H | H | Do. |
| 155 | 4 | K₇ | do | —S— | | H | H | Do. |
| 156 | 4 | K₁₅ | do | —S— | | H | H | Do. |
| 157 | 4 | K₁₆ | do | —S— | | H | H | Do. |
| 158 | 4 | K₁ | do | —S— | | H | 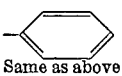 | Do. |
| 159 | 4 | K₁₆ | do | —S— | | H | Same as above | Do. |
| 160 | 4 | K₁ | do | —SO₂— | | H | do | Do. |
| 161 | 4 | K₁₆ | do | —SO₂— | | H | do | Do. |
| 162 | 4 | K₁ | do | —SO₂— | | —CONH₂ | do | Reddish yellow. |
| 163 | 4 | K₁₆ | do | —SO₂— | | Same as above | do | Do. |
| 164 | 4 | K₁ | do | —SO₂— | | do | H | Yellow. |
| 165 | 4 | K₁₆ | do | —SO₂— | | do | H | Do. |
| 166 | 4 | K₁ | —CH₂—CH—CH₂—<br>  OH | —SO₂— | | —CH₃ | 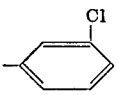 | Do. |
| 167 | 4 | K₁₆ | Same as above | —SO₂— | | Same as above | Same as above | Do. |
| 168 | 4 | K₁ | do | —S— | 3-chloro | do | H | Do. |
| 169 | 4 | K₁₆ | do | —S— | do | do | 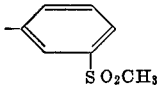 | Do. |
| 170 | 4 | K₁ | do | —S— | 3—SO₂—CH₃ | do | H | Do. |
| 171 | 4 | K₁₆ | do | —S— | Same as above | do | 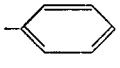 | Do. |
| 172 | 4 | K₁ | do | —S— | do | —CO—NH₂ | Same as above | Do. |
| 173 | 4 | K₁₆ | do | —S— | do | —CO—NH₂ | H | Do. |

| Ex. No. | Position of K⊕-y-Z-group in ring B and signification of K⊕, y, and Z or of K⊕ and y jointly with Z | | | Substituent in ring B and position | R | X | Shade of dyeing on acrylic fibre |
|---|---|---|---|---|---|---|---|
| | Position | K⊕ | y jointly with Z | | | | |
| 174 | 2 | K₁ | 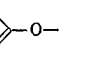 | | —CH₃ | 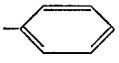 | Yellow. |
| 175 | 2 | K₂ | Same as above | | Same as above | Same as above | Do. |
| 176 | 2 | K₃ | do | | do | do | Do. |
| 177 | 2 | K₄ | do | | do | do | Do. |
| 178 | 2 | K₅ | do | | do | do | Do. |
| 179 | 2 | K₆ | do | | do | do | Do. |
| 180 | 2 | K₇ | do | | do | do | Do. |
| 181 | 2 | K₈ | do | | do | do | Do. |
| 182 | 2 | K₉ | do | | do | do | Do. |
| 183 | 2 | K₁₀ | do | | do | do | Do. |
| 184 | 2 | K₁₁ | do | | do | do | Do. |
| 185 | 2 | K₁₂ | do | | do | do | Do. |
| 186 | 2 | K₁₃ | do | | do | do | Do. |
| 187 | 2 | K₁₄ | do | | do | do | Do. |
| 188 | 2 | K₁₅ | do | | do | do | Do. |
| 189 | 2 | K₁₆ | do | | do | do | Do. |
| 190 | 2 | K₁₇ | do | | do | do | Do. |
| 191 | 2 | K₁₈ | do | | do | do | Do. |
| 192 | 2 | K₁₉ | do | | do | do | Do. |
| 193 | 2 | K₂₀ | do | | do | do | Do. |
| 194 | 2 | K₂₂ | do | | do | do | Do. |
| 195 | 2 | K₂₃ | do | | do | do | Do. |
| 196 | 2 | K₂₃ | do | | do | do | Do. |
| 197 | 2 | K₁ | do | | do | H | Do. |
| 198 | 2 | K₂ | do | | do | H | Do. |

| Ex. No. | Position | K⊕ | y jointly with Z | Substituent in ring B and position | R | X | Shade of dyeing on acrylic fibre |
|---|---|---|---|---|---|---|---|
| 199 | 2 | $K_3$ | ...do... | ...do... | | H | Do. |
| 200 | 2 | $K_4$ | ...do... | ...do... | | H | Do. |
| 201 | 2 | $K_5$ | ...do... | ...do... | | H | Do. |
| 202 | 2 | $K_6$ | ...do... | ...do... | | H | Do. |
| 203 | 2 | $K_7$ | ...do... | ...do... | | H | Do. |
| 204 | 2 | $K_8$ | ...do... | ...do... | | H | Do. |
| 205 | 2 | $K_9$ | ...do... | ...do... | | H | Do. |
| 206 | 2 | $K_{10}$ | ...do... | ...do... | | H | Do. |
| 207 | 2 | $K_{11}$ | ...do... | ...do... | | H | Do. |
| 208 | 2 | $K_{12}$ | ...do... | ...do... | | H | Do. |
| 209 | 2 | $K_{13}$ | ...do... | ...do... | | H | Do. |
| 210 | 2 | $K_{14}$ | ...do... | ...do... | | H | Do. |
| 211 | 2 | $K_{15}$ | ...do... | ...do... | | H | Do. |
| 212 | 2 | $K_{16}$ | ...do... | ...do... | | H | Do. |
| 213 | 2 | $K_{17}$ | ...do... | ...do... | | H | Do. |
| 214 | 2 | $K_{18}$ | ...do... | ...do... | | H | Do. |
| 215 | 2 | $K_{19}$ | ...do... | ...do... | | H | Do. |
| 216 | 2 | $K_{20}$ | ...do... | ...do... | | H | Do. |
| 217 | 2 | $K_{21}$ | —CH$_2$—C$_6$H$_4$—O— | | ...do... | H | Do. |
| 218 | 2 | $K_{22}$ | Same as above | | ...do... | H | Do. |
| 219 | 2 | $K_{23}$ | ...do... | | ...do... | H | Do. |
| 220 | 2 | $K_1$ | —CH$_2$—C$_6$H$_4$—S— | | ...do... | H | Do. |
| 221 | 2 | $K_{16}$ | Same as above | | ...do... | H | Do. |
| 222 | 2 | $K_1$ | ...do... | | ...do... | —C$_6$H$_5$ | Do. |
| 223 | 2 | $K_{16}$ | ...do... | | ...do... | Same as above | Do. |
| 224 | 2 | $K_1$ | H$_3$C—(—H$_2$C)C$_6$H$_3$—SO$_2$— | | ...do... | ...do... | Do. |
| 225 | 2 | $K_{16}$ | Same as above | | ...do... | ...do... | Do. |
| 226 | 2 | $K_1$ | ...do... | | ...do... | H | Do. |
| 227 | 2 | $K_{16}$ | ...do... | | ...do... | H | Do. |
| 228 | 2 | $K_1$ | ...do... | 3-chloro | ...do... | H | Do. |
| 229 | 2 | $K_{16}$ | ...do... | ...do... | ...do... | H | Do. |
| 230 | 2 | $K_1$ | ...do... | ...do... | —CO—NH$_2$ | H | Do. |
| 231 | 2 | $K_{16}$ | ...do... | ...do... | Same as above | H | Do. |
| 232 | 2 | $K_1$ | ...do... | ...do... | ...do... | H | Do. |
| 233 | 2 | $K_{16}$ | ...do... | ...do... | ...do... | H | Do. |
| 234 | 2 | $K_1$ | ...do... | | —CH$_3$ | H | Do. |
| 235 | 2 | $K_{16}$ | ...do... | | Same as above | —CH$_3$ | Do. |
| 236 | 2 | $K_1$ | ...do... | | ...do... | Same as above | Do. |
| 237 | 2 | $K_1$ | ...do... | 3—SO$_2$—CH$_3$ | ...do... | ...do... | Do. |
| 238 | 2 | $K_{16}$ | ...do... | Same as above | ...do... | ...do... | Do. |
| 239 | 2 | $K_1$ | ...do... | ...do... | ...do... | H | Do. |
| 240 | 2 | $K_{16}$ | ...do... | ...do... | ...do... | H | Do. |
| 241 | 2 | $K_1$ | —H$_2$C—(H$_3$C)C$_6$H$_3$—O— | 3-chloro | ...do... | —C$_6$H$_5$ | Do. |
| 242 | 2 | $K_{16}$ | Same as above | Same as above | ...do... | Same as above | Do. |
| 243 | 2 | $K_1$ | ...do... | 3-SO$_2$—CH$_3$ | ...do... | ...do... | Do. |
| 244 | 2 | $K_{16}$ | ...do... | Same as above | ...do... | ...do... | Do. |
| 245 | 2 | $K_1$ | ...do... | 3-SO$_2$N(CH$_3$)$_2$ | ...do... | ...do... | Do. |
| 246 | 2 | $K_{16}$ | ...do... | Same as above | ...do... | ...do... | Do. |
| 247 | 2 | $K_1$ | —CH$_2$—CO—NH—CH$_2$—C$_6$H$_4$—O— | | ...do... | H | Do. |
| 248 | 2 | $K_2$ | Same as above | | ...do... | H | Do. |
| 249 | 2 | $K_7$ | ...do... | | ...do... | H | Do. |
| 250 | 2 | $K_{16}$ | ...do... | | ...do... | H | Do. |
| 251 | 2 | $K_1$ | ...do... | | ...do... | —C$_6$H$_5$ | Do. |
| 252 | 2 | $K_{16}$ | ...do... | | ...do... | Same as above | Do. |
| 253 | 3 | $K_1$ | H$_3$C—(—H$_2$C)C$_6$H$_3$—SO$_2$— | | ...do... | H | Do. |
| 254 | 3 | $K_7$ | Same as above | | —CH$_3$ | H | Do. |
| 255 | 3 | $K_{16}$ | ...do... | | Same as above | H | Do. |
| 256 | 3 | $K_1$ | ...do... | | —CO—NH$_2$ | H | Do. |
| 257 | 3 | $K_{16}$ | ...do... | | Same as above | H | Do. |
| 258 | 3 | $K_1$ | ...do... | 6-Cl | —CH$_3$ | H | Do. |
| 259 | 3 | $K_{16}$ | ...do... | Same as above | Same as above | H | Do. |
| 260 | 3 | $K_1$ | —CH$_2$—C$_6$H$_4$—S— | | ...do... | H | Do. |

3,577,404

TABLE—Continued

| Ex. No. | Position | K⊕ | y jointly with Z | Substituent in ring B and position | R | X | Shade of dyeing on acrylic fibre |
|---|---|---|---|---|---|---|---|
| 261 | 3 | K₇ | Same as above | | do | H | Do. |
| 262 | 3 | K₁₆ | do | | do | H | Do. |
| 263 | 3 | K₁ | do | | —CO—NH₂ | H | Do. |
| 264 | 3 | K₁₆ | do | | Same as above | H | Do. |
| 265 | 3 | K₁ | do | | —CH₃ |  | Do. |
| 266 | 3 | K₁₆ | do | | Same as above | Same as above | Do. |
| 267 | 3 | K₁ | —CH₂—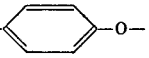—O— | | do | do | Do. |
| 268 | 3 | K₂ | Same as above | | do | do | Do. |
| 269 | 3 | K₃ | do | | do | do | Do. |
| 270 | 3 | K₄ | do | | do | do | Do. |
| 271 | 3 | K₅ | do | | do | do | Do. |
| 272 | 3 | K₆ | do | | do | do | Do. |
| 273 | 3 | K₇ | do | | do | do | Do. |
| 274 | 3 | K₈ | do | | do | do | Do. |
| 275 | 3 | K₉ | do | | do | do | Do. |
| 276 | 3 | K₁₀ | do | | do | do | Do. |
| 277 | 3 | K₁₁ | do | | do | do | Do. |
| 278 | 3 | K₁₂ | do | | do | do | Do. |
| 279 | 3 | K₁₃ | do | | do | do | Do. |
| 280 | 3 | K₁₄ | do | | do | do | Do. |
| 281 | 3 | K₁₅ | do | | do | do | Do. |
| 282 | 3 | K₁₆ | do | | do | do | Do. |
| 283 | 3 | K₁₇ | do | | do | do | Do. |
| 284 | 3 | K₁₈ | do | | do | do | Do. |
| 285 | 3 | K₁₉ | do | | do | do | Do. |
| 286 | 3 | K₂₀ | do | | do | do | Do. |
| 287 | 3 | K₂₁ | do | | do | do | Do. |
| 288 | 3 | K₂₂ | do | | do | do | Do. |
| 289 | 3 | K₂₃ | do | | do | do | Do. |
| 290 | 3 | K₁ | do | | do | H | Do. |
| 291 | 3 | K₂ | do | | do | H | Do. |
| 292 | 3 | K₃ | do | | do | H | Do. |
| 293 | 3 | K₄ | do | | do | H | Do. |
| 294 | 3 | K₅ | do | | do | H | Do. |
| 295 | 3 | K₆ | do | | do | H | Do. |
| 296 | 3 | K₇ | do | | do | H | Do. |
| 297 | 3 | K₈ | do | | do | H | Do. |
| 298 | 3 | K₉ | do | | do | H | Do. |
| 299 | 3 | K₁₀ | do | | do | H | Do. |
| 300 | 3 | K₁₁ | do | | do | H | Do. |
| 301 | 3 | K₁₂ | do | | do | H | Do. |
| 302 | 3 | K₁₃ | do | | do | H | Do. |
| 303 | 3 | K₁₄ | do | | do | H | Do. |
| 304 | 3 | K₁₅ | do | | do | H | Do. |
| 305 | 3 | K₁₆ | do | | do | H | Do. |
| 306 | 3 | K₁₇ | do | | do | H | Do. |
| 307 | 3 | K₁₈ | do | | do | H | Do. |
| 308 | 3 | K₁₉ | do | | do | H | Do. |
| 309 | 3 | K₂₀ | do | | do | H | Do. |
| 310 | 3 | K₂₁ | do | | do | H | Do. |
| 311 | 3 | K₂₂ | do | | do | H | Do. |
| 312 | 3 | K₂₃ | do | | do | H | Do. |
| 313 | 3 | K₁ | —CH₂—CO—NH—CH₂—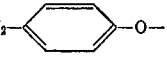—O— | | do | H | Do. |
| 314 | 3 | K₁₆ | Same as above | | do | H | Do. |
| 315 | 3 | K₁ | do | | do |  | Do. |
| 316 | 3 | K₁₆ | do | | do | H | Do. |
| 317 | 3 | K₁ | —CH₂—CO—NH—CH₂—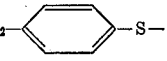—S— | | do | H | Do. |
| 318 | 3 | K₁₆ | Same as above | | do | H | Do. |
| 319 | 3 | K₁ | do | | do | H | Do. |
| 320 | 3 | K₁₆ | do | | do | H | Do. |
| 321 | 4 | K₁ | —CH₂—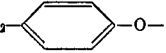—O— | | do | H | Do. |
| 322 | 4 | K₂ | same as above | | do | H | Do. |
| 323 | 4 | K₃ | do | | do | H | Do. |
| 324 | 4 | K₄ | do | | do | H | Do. |
| 325 | 4 | K₅ | do | | do | H | Do. |
| 326 | 4 | K₆ | do | | do | H | Do. |
| 327 | 4 | K₇ | do | | do | H | Do. |
| 328 | 4 | K₈ | do | | do | H | Do. |
| 329 | 4 | K₉ | do | | do | H | Do. |
| 330 | 4 | K₁₀ | do | | do | H | Do. |
| 331 | 4 | K₁₁ | do | | do | H | Do. |
| 332 | 4 | K₁₂ | do | | do | H | Do. |
| 333 | 4 | K₁₃ | do | | do | H | Do. |
| 334 | 4 | K₁₄ | do | | do | H | Do. |
| 335 | 4 | K₁₅ | do | | do | H | Do. |
| 336 | 4 | K₁₆ | do | | do | H | Do. |
| 337 | 4 | K₁₇ | do | | do | H | Do. |
| 338 | 4 | K₁₈ | do | | do | H | Do. |
| 339 | 4 | K₁₉ | do | | do | H | Do. |

TABLE—Continued

| Ex. No. | Position | K⊕ | y jointly with Z | Substituent in ring B and position | R | X | Shade of dyeing on acrylic fibre |
|---|---|---|---|---|---|---|---|
| 340 | 4 | K₂₀ | ---do--- | ---do--- | ---do--- | H | Do. |
| 341 | 4 | K₂₁ | ---do--- | ---do--- | ---do--- | H | Do. |
| 342 | 4 | K₂₂ | ---do--- | ---do--- | ---do--- | H | Do. |
| 343 | 4 | K₂₃ | ---do--- | ---do--- | ---do--- | H | Do. |
| 344 | 4 | K₁ | ---do--- | ---do--- | ---do--- | —C₆H₅ | Do. |
| 345 | 4 | K₂ | ---do--- | ---do--- | ---do--- | Same as above | Do. |
| 346 | 4 | K₃ | ---do--- | ---do--- | ---do--- | ---do--- | Do. |
| 347 | 4 | K₄ | ---do--- | ---do--- | ---do--- | ---do--- | Do. |
| 348 | 4 | K₅ | ---do--- | ---do--- | ---do--- | ---do--- | Do. |
| 349 | 4 | K₆ | ---do--- | ---do--- | ---do--- | ---do--- | Do. |
| 350 | 4 | K₇ | ---do--- | ---do--- | ---do--- | ---do--- | Do. |
| 351 | 4 | K₈ | ---do--- | ---do--- | ---do--- | ---do--- | Do. |
| 352 | 4 | K₉ | ---do--- | ---do--- | ---do--- | ---do--- | Do. |
| 353 | 4 | K₁₀ | ---do--- | ---do--- | ---do--- | ---do--- | Do. |
| 354 | 4 | K₁₁ | ---do--- | ---do--- | ---do--- | ---do--- | Do. |
| 355 | 4 | K₁₂ | ---do--- | ---do--- | ---do--- | ---do--- | Do. |
| 356 | 4 | K₁₃ | ---do--- | ---do--- | ---do--- | ---do--- | Do. |
| 357 | 4 | K₁₄ | ---do--- | ---do--- | ---do--- | ---do--- | Do. |
| 358 | 4 | K₁₅ | ---do--- | ---do--- | ---do--- | ---do--- | Do. |
| 359 | 4 | K₁₆ | ---do--- | ---do--- | ---do--- | ---do--- | Do. |
| 360 | 4 | K₁₇ | ---do--- | ---do--- | ---do--- | ---do--- | Do. |
| 361 | 4 | K₁₈ | ---do--- | ---do--- | ---do--- | ---do--- | Do. |
| 362 | 4 | K₁₉ | ---do--- | ---do--- | ---do--- | ---do--- | Do. |
| 363 | 4 | K₂₀ | ---do--- | ---do--- | ---do--- | ---do--- | Do. |
| 364 | 4 | K₂₁ | ---do--- | ---do--- | ---do--- | ---do--- | Do. |
| 365 | 4 | K₂₂ | ---do--- | ---do--- | ---do--- | ---do--- | Do. |
| 366 | 4 | K₂₃ | ---do--- | ---do--- | ---do--- | ---do--- | Do. |
| 367 | 4 | K₁ | —CH₂—CO—NH—CH₂—C₆H₄—O— | | ---do--- | H | Do. |
| 368 | 4 | K₁₆ | Same as above | | ---do--- | H | Do. |
| 369 | 4 | K₁ | ---do--- | | ---do--- | —C₆H₅ | Do. |
| 370 | 4 | K₁₆ | ---do--- | | ---do--- | Same as above | Do. |
| 371 | 4 | K₁ | —CH₂—C₆H₄—S— | | ---do--- | H | Do. |
| 372 | 4 | K₁₆ | Same as above | | ---do--- | H | Do. |
| 373 | 4 | K₁ | ---do--- | | ---do--- | —C₆H₅ | Do. |
| 374 | 4 | K₇ | ---do--- | | ---do--- | Same as above | Do. |
| 375 | 4 | K₁₆ | ---do--- | | ---do--- | ---do--- | Do. |
| 376 | 4 | K₁ | —CH₂—C₆H₄—SO₂— | | ---do--- | ---do--- | Do. |
| 377 | 4 | K₁₆ | Same as above | | ---do--- | ---do--- | Do. |
| 378 | 4 | K₁ | ---do--- | | ---do--- | H | Do. |
| 379 | 4 | K₁₆ | ---do--- | | ---do--- | H | Do. |
| 380 | 4 | K₁ | —CH₂—C₆H₄—O— | 3-chloro | ---do--- | H | Do. |
| 381 | 4 | K₁ | Same as above | Same as above | ---do--- | H | Do. |
| 382 | 4 | K₇ | ---do--- | ---do--- | ---do--- | H | Do. |
| 383 | 4 | K₁₅ | ---do--- | ---do--- | ---do--- | H | Do. |
| 384 | 4 | K₁₆ | ---do--- | ---do--- | ---do--- | H | Do. |
| 385 | 4 | K₁ | —CH₂—C₆H₃(CH₃)—O— | | ---do--- | H | Do. |
| 386 | 4 | K₁₆ | Same as above | ---do--- | ---do--- | H | Do. |
| 387 | 4 | K₁ | ---do--- | 3-SO₂—CH₃ | ---do--- | H | Do. |
| 388 | 4 | K₁₆ | ---do--- | Same as above | ---do--- | H | Do. |
| 389 | 4 | K₁ | ---do--- | ---do--- | ---do--- | H | Do. |
| 390 | 4 | K₁₆ | ---do--- | ---do--- | ---do--- | H | Do. |
| 391 | 4 | K₁ | ---do--- | | ---do--- | —C₆H₅ | Do. |
| 392 | 4 | K₁₆ | ---do--- | | ---do--- | Same as above | Do. |
| 393 | 4 | K₁ | ---do--- | | ---do--- | —C₆H₄—CH₃ | Do. |
| 394 | 4 | K₁₆ | ---do--- | | ---do--- | Same as above | Do. |
| 395 | 4 | K₁ | ---do--- | | ---do--- | H | Do. |
| 396 | 4 | K₁₆ | ---do--- | | ---do--- | H | Do. |
| 397 | 4 | K₁ | ---do--- | | —CONH₂ | H | Do. |
| 398 | 4 | K₁ | ---do--- | | Same as above | H | Do. |
| 399 | 4 | K₁₆ | ---do--- | | ---do--- | H | Do. |

TABLE—Continued

| Ex. No. | Position K⊕ | y jointly with Z | Substituent in ring B and position | R | X | Shade of dyeing on acrylic fibre |
|---|---|---|---|---|---|---|
| 400 | 4 K₁ | ....do.... | | ....do.... | —⟨phenyl⟩ | Reddish yellow. |
| 401 | 4 K₁₆ | ....do.... | | ....do.... | Same as above | Do. |
| 402 | 4 K₁ | —CH₂—NH—CO—CH₂—⟨phenyl⟩—O— | | —CH₃ | —⟨phenyl-Cl⟩ | Yellow. |
| 403 | 4 K₂ | Same as above | | Same as above | Same as above | Do. |
| 404 | 4 K₃ | ....do.... | | ....do.... | ....do.... | Do. |
| 405 | 4 K₄ | ....do.... | | ....do.... | ....do.... | Do. |
| 406 | 4 K₅ | ....do.... | | ....do.... | H | Do. |
| 407 | 4 K₆ | ....do.... | | ....do.... | H | Do. |
| 408 | 4 K₇ | ....do.... | | ....do.... | H | Do. |
| 409 | 4 K₈ | ....do.... | | ....do.... | H | Do. |
| 410 | 4 K₉ | ....do.... | | ....do.... | H | Do. |
| 411 | 4 K₁₀ | ....do.... | | ....do.... | H | Do. |
| 412 | 4 K₁₁ | ....do.... | | ....do.... | H | Do. |
| 413 | 4 K₁₂ | ....do.... | | ....do.... | H | Do. |
| 414 | 4 K₁₃ | ....do.... | | ....do.... | H | Do. |
| 415 | 4 K₁₄ | ....do.... | | ....do.... | H | Do. |
| 416 | 4 K₁₅ | ....do.... | | ....do.... | H | Do. |
| 417 | 4 K₁₆ | ....do.... | | ....do.... | H | Do. |
| 418 | 4 K₁₇ | ....do.... | | ....do.... | H | Do. |
| 419 | 4 K₁₈ | ....do.... | | ....do.... | H | Do. |
| 420 | 4 K₁₉ | ....do.... | | ....do.... | H | Do. |
| 421 | 4 K₂₀ | ....do.... | | ....do.... | H | Do. |
| 422 | 4 K₂₁ | ....do.... | | ....do.... | H | Do. |
| 423 | 4 K₂₂ | ....do.... | | ....do.... | H | Do. |
| 424 | 4 K₂₃ | ....do.... | | ....do.... | H | Do. |

EXAMPLE 425

The compound 4-(2'-amino-4'-chlorophenoxy)-benzyl-N,N-dimethylhydrazinium chloride is prepared by reaction in chlorobenzene solution of 4-(2'-acetamino-4'-chlorophenoxy)-benzyl chloride with dimethylhydrazine and subsequent saponification to the amino compound. 32.8 parts of this compound are diazotized in dilute ice-cold hydrochloric acid by the known method. After neutralization of the diazo solution with sodium carbonate an ethyl alcohol solution of 19 parts of 1-phenyl-3-methyl-5-pyrazolone is added at 0° and stirring is continued at this temperature until the coupling reaction is complete. The dye thus formed settles out. It is collected on a filter, dried and ground, whereupon it is obtained as a yellow powder which is applicable to acrylic fibres. On these fibres it gives fast yellow dyeings.

Dyes with very similar, equally good properties are obtained when the 38.2 parts of 4-(2'-amino-4'-chlorophenoxy)-benzyl-N,N-dimethylhydrazinium chloride employed in this example are replaced by the equivalent amount of 4-(2'-amino-4'-chlorophenoxy)-benzyl-N,N,N-trimethylammonium chloride or by 4-(2'-amino-4'-chlorophenoxy)-benzyl-pyridinium chloride, or again when the 19 parts of 1-phenyl-3-methyl-5-pyrazolone are replaced by 11 parts of 3-methyl-5-pyrazolone, the process of production being otherwise exactly as described in the above.

Formulae of representative dyes of the foregoing examples are as follows:

EXAMPLE 1

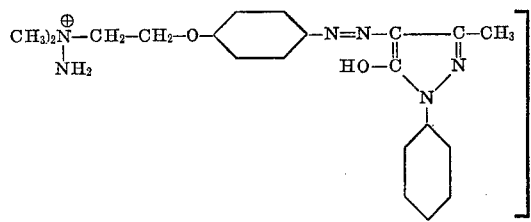

EXAMPLE 4

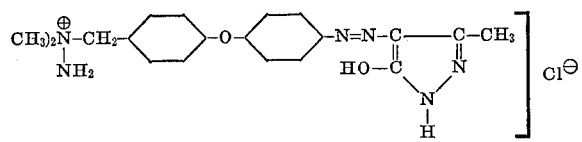

EXAMPLE 174

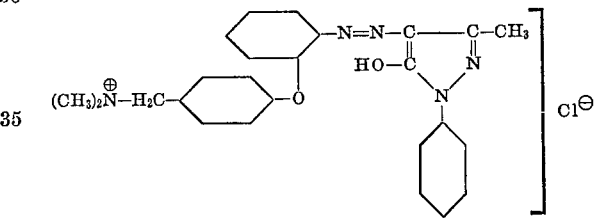

EXAMPLE 189

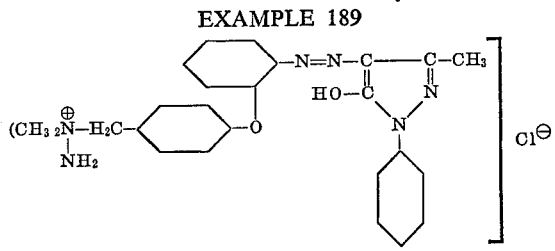

EXAMPLE 425

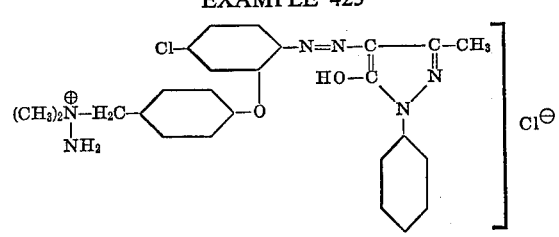

Having thus disclosed the invention what we claim is:
1. Basic dye of the formula

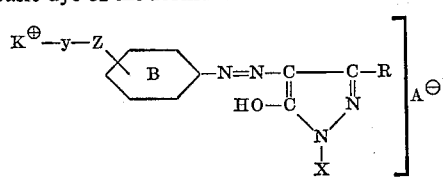

wherein

R is a member selected from the group consisting of (a) substituted or unsubstituted hydrocarbon, (b) carboxamide, (c) carboxylic acid hydroxyethylamide, (d) carboxylic acid phenylamide, (e) cyano and (f) hydrogen;

X is a member selected from the group consisting of hydrogen and substituted or unsubstituted hydrocarbon;

y is a member selected from the group consisting of (a) unsubstituted or hydroxy-substituted alkylene having from 1 to 6 carbon atoms and (b) unsubstituted or alkoxy-substituted arylene; bound to K⊕ by a bridge selected from the group consisting of unsubstituted or hydroxy-substituted alkylene having from 1 to 6 carbon atoms,

—CH₂—CO—NH—CH₂— and —CH₂—NH—CO—CH₂—;

Z is —O—, —S— or —SO₂—;

A⊖ is an anion [equivalent to the dye cation];

K⊕ is a group of the formula

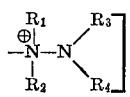

or of the formula

$R_1$ is a member selected from the group consisting of alkyl, substituted alkyl, cyclohexyl, substituted cyclohexyl and, together with $R_2$ and the nitrogen atom to which both are bound, a heterocycle; any substituent of the substituted alkyl or substituted cyclohexyl being selected from the group consisting of hydroxy, halo, cyano and phenyl; the heterocycle being a member selected from the group consisting of pyrrolidine, piperazine, morpholine, aziridine and piperidine;

$R_2$ is a member selected from the group consisting of alkyl, substituted alkyl, cyclohexyl, substituted cyclohexyl and, together with $R_1$ and the nitrogen atom to which both are bound, a heterocyclic; any substituent of the substituted alkyl or substituted cyclohexyl being selected from the group consisting of hydroxy, halo, cyano and phenyl; the heterocycle being a member selected from the group consisting of pyrrolidine, piperazine, morpholine, aziridine and piperidine;

each of $R_3$ and $R_4$ is, independently, a member selected from the group consisting of hydrogen, alkyl, substituted alkyl, cyclohexyl and substituted cyclohexyl; any substituent of the substituted alkyl or substituted cyclohexyl being selected from the group consisting of hydroxy, halo, cyano and phenyl;

each of $R_5$, $R_6$ and $R_7$ is, independently, a member selected from the group consisting of alkyl, substituted alkyl, cyclohexyl and substituted cyclohexyl; any substituent of the substituted alkyl or substituted cyclohexyl being selected from the group consisting of hydroxy, halo, cyano and phenyl;

or $R_5$, $R_6$ and $R_7$ are together with the nitrogen atom to which each is bound, a member selected from the group consisting of pyridinium and monoquaternized triethylenediamine;

or $R_5$ and $R_6$ are together with the nitrogen atom to which both are bound, a heterocycle selected from the group consisting of piperidine, piperazine, pyrrolidine, morpholine and aziridine;

or $R_1$ with $R_3$ and the respective nitrogen atoms to which they are bound is a saturated or unsaturated 5- or 6- membered heterocycle, each ring member of which is carbon, nitrogen or oxygen;

or $R_2$ with $R_4$ and the respective nitrogen atoms to which they are bound is a saturated or unsaturated 5- or 6-membered heterocycle, each ring member of which is carbon, nitrogen or oxygen;

and wherein aromatic ring B is either further unsubstituted or is further substituted, any substituent thereon being a member selected from the group consisting of alkyl, alkoxy, cyano, nitro, alkylsulphonyl, arylsulphonyl, carbonyl, trifluoromethyl and halo; hydrocarbon being a member selected from the group consisting of alkyl, aryl and cyclohexyl; any substituent on a substituted hydrocarbon being a member selected from the group consisting of hydroxy, halo, cyano and aryl; each alkyl and each alkoxy having from 1 to 4 carbon atoms; and each aryl and the aryl of each arylene being a member selected from the group consisting of phenyl, naphthyl and tetrahydronaphthyl.

2. Basic dye according to claim 1 wherein y is unsubstituted or hydroxy-substituted alkylene having from 1 to 6 carbon atoms, Z is in one of the 3- and 4-positions on ring B, and any heterocycle of $R_1$ with $R_3$ or $R_2$ with $R_4$ is a member selected from the group consisting of pyrazolidine, pyridazine and pyrazoline.

3. Basic dye according to claim 1 wherein y is unsubstituted or hydroxy-substituted alkylene having from 1 to 6 carbon atoms, Z is in the 2-position on ring B, and any heterocycle of $R_1$ with $R_3$ or $R_2$ with $R_4$ is a member selected from the group consisting of pyrazolidine, pyridazine and pyrazoline.

4. Basic dye according to claim 1 wherein y is unsubstituted or alkoxy-substituted arylene and any heterocycle of $R_1$ with $R_3$ or $R_2$ with $R_4$ is a member selected from the group consisting of pyrazolidine, pyridazine and pyrazoline.

5. Basic dye according to claim 1 wherein X is substituted or unsubstituted hydrocarbon, the hydrocarbon is phenyl, R is methyl, and any heterocycle of $R_1$ with $R_3$ or $R_2$ with $R_4$ is a member selected from the group consisting of pyrazolidine, pyridazine and pyrazoline.

6. Basic dye according to claim 1 wherein y is paraphenylene, the bridge is a member selected from the group consisting of

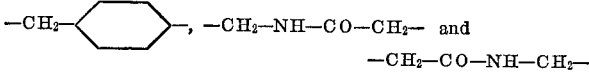

and any heterocycle of $R_1$ with $R_3$ or $R_2$ with $R_4$ is a member selected from the group consisting of pyrazolidine, pyridazine and pyrazoline.

7. Basic dye according to claim 1 in which Z is O.

8. The basic dye according to claim 1 of the formula

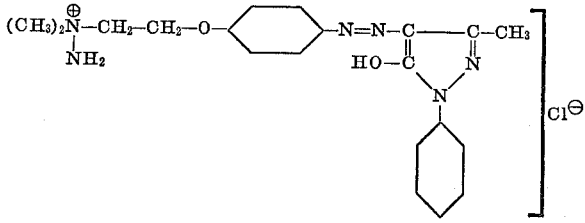

9. The basic dye according to claim 1 of the formula

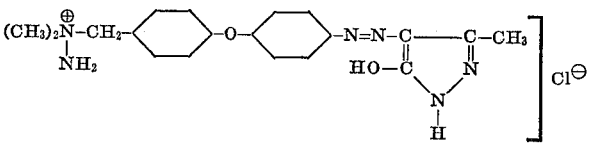

10. The basic dye according to claim 1 of the formula

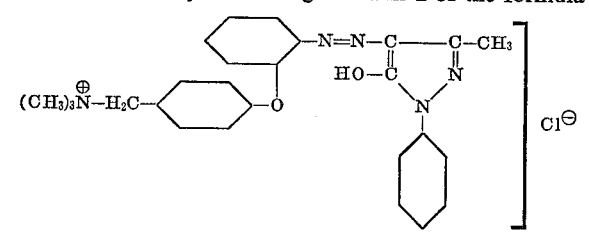

11. The basic dye according to claim 1 of the formula
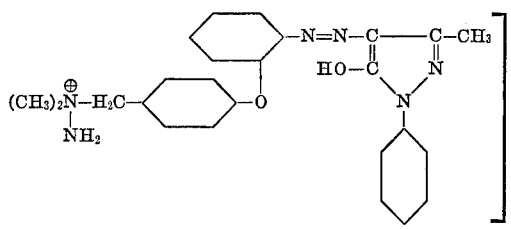
12. The basic dye according to claim 1 of the formula
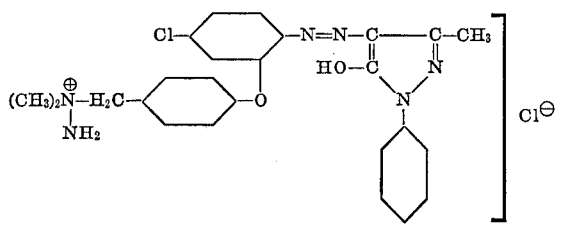
References Cited
UNITED STATES PATENTS
| | | | |
|---|---|---|---|
| 2,128,255 | 8/1938 | Krzikalla et al. | 260—163X |
| 2,128,256 | 8/1938 | Krzikalla et al. | 260—156X |
| 2,140,944 | 12/1938 | Schirm | 260—156 |
| 2,224,112 | 12/1940 | Krzikalla et al. | 260—156 |
| 2,476,986 | 7/1949 | Martin | 260—156X |
| 2,633,461 | 3/1953 | Seidenfaden et al. | 260—207X |
| 3,170,910 | 2/1965 | Neracher et al. | 260—156X |
| 3,252,965 | 5/1966 | Entschel et al. | 260—152X |
FLOYD D. HIGEL, Primary Examiner
U.S. Cl. X.R.
8—4, 7, 13, 41; 117—138.8, 142, 154; 260—37, 152, 155, 156, 163, 296, 569